(12) United States Patent
Ovide

(10) Patent No.: US 9,374,608 B2
(45) Date of Patent: Jun. 21, 2016

(54) SYSTEM AND METHOD FOR CREATING INDIVIDUALIZED MOBILE AND VISUAL ADVERTISMENTS USING FACIAL RECOGNITION

(71) Applicant: Christopher Brian Ovide, Norfolk, VA (US)

(72) Inventor: Christopher Brian Ovide, Norfolk, VA (US)

(73) Assignee: Christopher B Ovide, Norfolk, VA (US)

( * ) Notice: Subject to any disclaimer, the term of this patent is extended or adjusted under 35 U.S.C. 154(b) by 32 days.

(21) Appl. No.: 14/551,076

(22) Filed: Nov. 23, 2014

(65) Prior Publication Data

US 2016/0150260 A1    May 26, 2016

(51) Int. Cl.

| | |
|---|---|
| *H04H 60/45* | (2008.01) |
| *H04H 60/43* | (2008.01) |
| *H04N 21/2668* | (2011.01) |
| *H04L 29/08* | (2006.01) |
| *H04N 21/442* | (2011.01) |
| *H04N 21/81* | (2011.01) |
| *H04N 21/25* | (2011.01) |

(52) U.S. Cl.
CPC .......... *H04N 21/2668* (2013.01); *H04L 67/306* (2013.01); *H04N 21/252* (2013.01); *H04N 21/44218* (2013.01); *H04N 21/812* (2013.01)

(58) Field of Classification Search
CPC combination set(s) only.
See application file for complete search history.

(56) References Cited

U.S. PATENT DOCUMENTS

| | | | |
|---|---|---|---|
| 8,296,808 B2* | 10/2012 | Hardacker | H04N 7/163 725/131 |
| 2009/0133051 A1* | 5/2009 | Hildreth | H04N 5/4403 725/28 |

* cited by examiner

*Primary Examiner* — Kieu Oanh T Bui

(57) ABSTRACT

A computer implemented advertisement method for matching a user with a computer generated advertisement that is compatible to a users of the methods preferred aesthetic. In one example the method comprises: receiving a profile generated by recording user choices from a field of images displayed to the user; applying a logistics regression model to the image choices to create a baseline aesthetic template used to determine the most appropriate model or actor to be inserted into the background of a still or video advertisement. Any results within a desired confidence level are returned to the user as and advertisement with the appropriate model or actor inserted by means of current and available technology into the ad to be displayed on the user's mobile or video device.

3 Claims, 3 Drawing Sheets

SYSTEM AND METHOD FOR CREATING INDIVIDUALIZED MOBILE AND VISUAL ADVERTISMENTS USING FACIAL RECOGNITION

TECHNICAL FIELD

The present invention, in some embodiments thereof, relates to mobile Internet or network based marketing and advertising services. The invention further has profound implications for advancing commercial TV's impact and more direct, unique experience given transmission to a broader audience.

RELATED APPLICATION

The present invention claims the benefit of Provisional Patent Application No. 61/963,949 filed Dec. 20, 2013, and U.S. Pat. No. 8,595,527 B1 dated Nov. 26 2013, the entirety of both of which are incorporated herein by reference.

BACKGROUND OF THE INVENTION

The present invention improves upon current mobile and visual advertisements and marketing services. Currently available online marketing services use ads created for large demographics, or if geared towards individual users, are generated by analyzing written or demographic surveys as well as other methods of targeting interested and relevant customers. The same is true with commercial advertising on TV. Aggregate demographic data is used in conjunction with applicable metadata, categorical or qualitative data on a particular user or household, in an attempt to create a more user unique, individualized marketing experience. Typically, collected data is used to create a profile of mobile users or potential viewers to determine appropriate advertisements or conversely the data is used in the plurality and an advertisement is directed towards a large demographic rather than individuals.

One of the problems we solve for with our method is creating an ad aesthetically appealing to consumers individually on an individualized global scale, reducing the time it takes to generate an appropriate profile for individual users under existing methods and the method by which the subsequent advertisement is then created. Mobile ads need to be location and time sensitive and while mobile marketing methods increase the conversion of data into a relevant advertising experience for users, we teach that our method is clearly advantageous and unique to current profiling done by large marketing firms or similar corporate giants such as Facebook. In addition, current mobile advertising using Web Banners or Mobile Web Posters have shown to be rather ineffective at enriching the users experience and providing advertisers with increase flow rate, "click-through", used to determine the effectiveness and subsequent value of the ad. As such the industry has relied on SMS, short message service, advertising rather than visual, more traditionally based, advertising, to drive revenue growth as the creation of individual specific, targeted Web Banners has proved less than ideal from a return on investment perspective.

This limitation is mainly due to the difficulty in creating ads targeted to individual, unique users and the limited space available in which to place the advertisements on mobile devices. Currently many large corporations are expending ever-increasing amounts of capital on the issue of maximizing target specific mobile advertising. We teach that a marriage of emerging technology and traditional advertising paradigms can have a significant positive impact on "click-through" rates and market adoption of our unique method.

Conventional Visual Advertising attraction is based upon many factors, including but not limited to aesthetic appeal of the model used in the advertisement. This aesthetic appeal will vary between each individual consumer, and as such traditional methods utilize aggregate data in creating average profiles for consumers in a specified local or demographic. Alternatively, target specific ads are currently generated by mining user choices and responses to written and or visual surveys with the hope of determining an individual marketing profile for each user. While this is obviously superior to aggregate demographic marketing it still leaves the question of an individual user's personal preference in terms of aesthetic appeal to debate considering the amount and variety of data that are used in determining currently placed ads.

We teach that by using binomial logistic regression to create an attraction model determined by recording the user's choices of thumbnail or other facial pictures amongst a field of such images, one can then determine a baseline aesthetic attraction model for each individual user of the mobile device without the need for any additional aggregate data or written surveys and analysis. While at the same time the addition of non-aesthetic, existing profile data and that derived from the method herein; should further enhance results.

One explanation for this increase in individual consumer appeal, is that the use of un-prompted choices amongst multiple options provides a view into the subconscious of mobile users and creates a marketing profile and model of aesthetic attraction that is free of potential influences and detractions that can enter into the profile by using written commands or prompts.

Aesthetic attraction is potentially the most important component of visual advertising. Understanding and shaping a mobile user's unique profile should be deconstructed so that different variables such as number of choices per page, number of same choices, time between choices, and other variables must be taken into account when building a user's individual aesthetic appeal model. We teach that the mobile internet, in particular phones and tablets, already provide the perfect medium for recording these choices in existing online dating sites. Many mobile dating applications, such as Grinder and Growler, utilize multiple facial thumbnails on a page or field in which the user, unprompted, by nature of the site touches on images, that from the minimal perspective of mobile media, appeal to the user's individual taste or attraction.

This allows for the uninhibited, subconscious choices of mobile users to be recorded, attraction profiles/models to be constructed and user specific mobile advertisements to be generated and populated on the screen of said user's mobile device.

The method of the present invention is designed to provide a model of a mobile user's aesthetic preference which can then, in turn, be used to populate ads which have a mathematical superior confidence interval of attracting a mobile phone user's attention; due to aesthetic appeal, hence promoting click-trough's and increased interest in otherwise potential generic advertisements.

BRIEF SUMMARY OF EMBODIMENTS OF THE INVENTION

The present invention, in some embodiments thereof, relates to a computer implemented matching method for creating mobile individualized, user-specific advertisements. The method is operable on a server comprising a processor and memory and connected to a mobile network. The method comprises: receiving a profile generated from recording a series of inputs or choices amongst a field of multiple thumbnail images such as found on Facebook, Gowler, Grinder etc; shown on the screen of a mobile device. Performing a facial recognition process on the chosen thumbnail. The user's choices of pictures are then logged by the method utilizing nominal, categorical and quantitative data including ranking of choice, number of choices per field, time between choices, time of viewing image, and similarity of facial features of choices which are then input as variables into a predictive model. These variables are used to create a forecasting model utilizing binomial regression to predict attraction, morphing the numerous choices into a single template. These templates are then stored, as a result of the process, on the server for both enhancing the profile with future inputs as well as matching the preferred aesthetic model with multiple images, the statistically significant number will be used to represent the general population, of advertising models which fit the user's attraction profile to a specific confidence interval. The models are then keyed into background ads using existing technology such as Adobe's Photoshop or in the case of video applications, Final Cut Pro.

This method changes the traditional technique of ad development and creation by utilizing facial recognition both as a predictor of attraction and subsequent computerized determinant of the human model who will most likely fit the line of the mobile user's aesthetic preference model; thereby enhancing, in terms of individual appeal, creation and speed, mobile advertising by a degree not possible with traditional advertising methods.

This improves over the current method by creating certain profiles and indications of passing consumers likes and dislikes as well as the appeal of certain ads allowing marketing companies to create increasingly targeted and effective advertisements amongst a generally, broad and diverse market that is laborious mined in order to create ads which may fit the laboriously surveyed demographic.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

Figure 1:
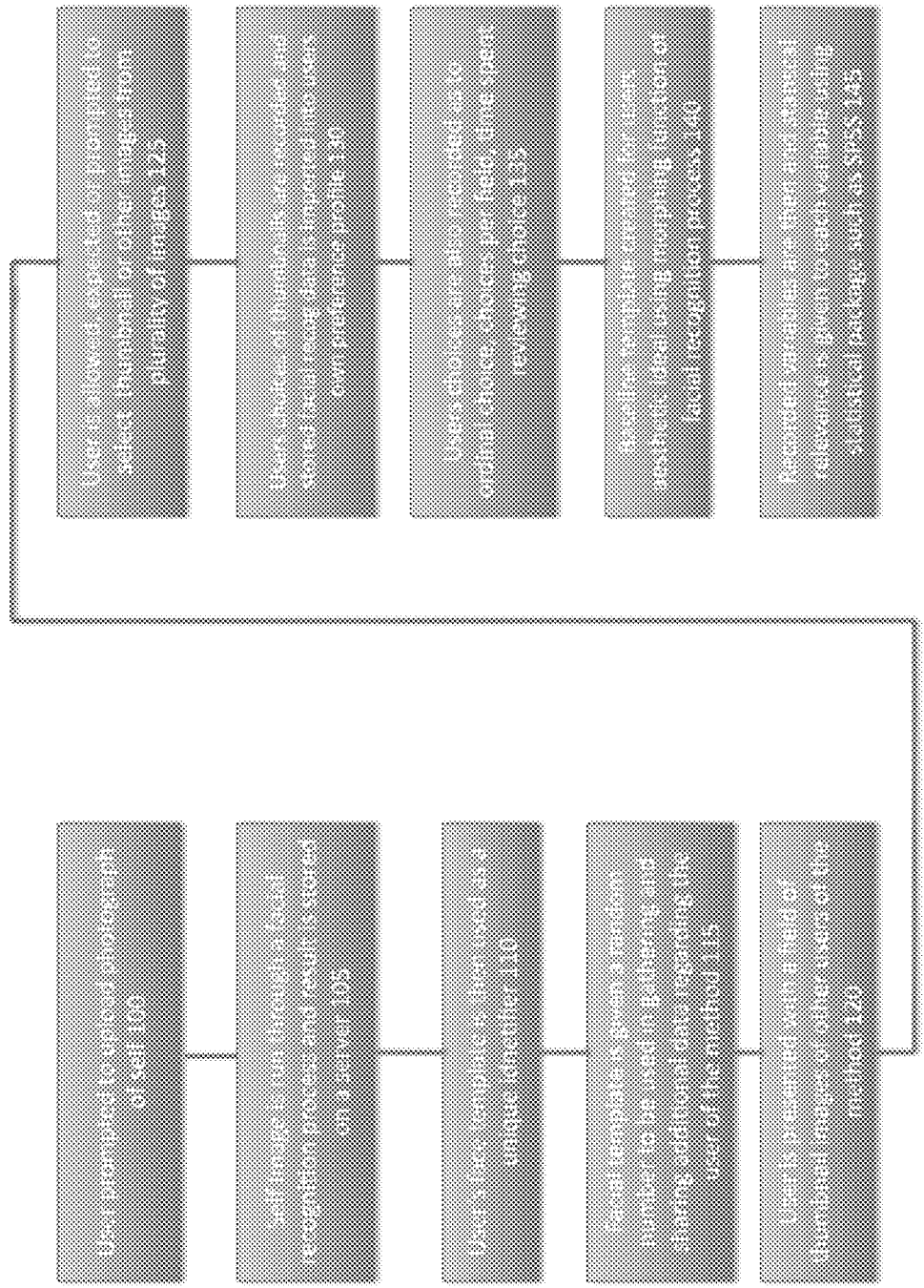
FIG. 1 is a flow chart of an example embodiment in accordance with the principles of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The present invention relates to a computer implemented method and system for creating mobile and televised advertisements by recording user inputs amongst a field of thumbnail images, or tracking users eye movements, using a facial recognition process to create an individual model of aesthetic appeal and subsequently using this model and facial recognition to populate the background of an ad with the photograph of a human model the user will find aesthetically attractive. The system utilizes one or more unique algorithms, techniques and computer implemented processes designed to be used by internet accessible mobile device users, patrons of certain establishments such as sports bars, and common pedestrians within defined billboard or posted adverting locales. The method specifically targets mobile device users searching the internet on stationary or mobile devices with the intention of locating, evaluating and communicating with other like minded or compatible persons for which the user finds aesthetically, or in some cases emotionally, appealing either locally or worldwide to provide its data driven marketing method.

In one variant, the system begins a process of building individual marketing profiles and subsequently mobile advertisements by creating a basic user profile with the facial template and ip address, or mobile device number of the user as an unique identifier, recording the user's choices amongst a field of thumbnail images and inputting this data, weighted by variables such as time spent on image, ordinal choice, number of click throughs, and any pertinent categorical data to be used in various means including the creation of a template used for the facial recognition identification, detection and matching process utilized by the system.

As the number of choices increases those additional choices are morphed into a single template, using any existing facial recognition process to serve that purpose, which results as the mean for the individual user's preferred aesthetic preference or mathematically expressed with the dependent variable Y. The consequent template is then continuously reconstructed by adding future choices, the co-efficient, of the user and weighting each new choice against the mean as to ordinal rank, time between choices, time spent reviewing picture, number of choices per field etc which represent the independent variables in a regression model or mathematically the variable X. Outlying data may or may not be excluded from future inputs or affect on the base model. This information is then used as a template against which the system then searches a library of human models or actors own facial templates derived with the use of a facial recognition process; identifying a matching profile/model based on the percentage match of multiple different facial nodes. For example, sixty facial nodes. This template can then be used as a standalone identifier or alternatively combined with personality and other demographic data to predict the likelihood of initial visual attraction or stimulation between the user of the method and the actor or model depicted in the advertisement. This attraction need not be of the sexual sort, and can include loving types of attraction or visual interest as found between a mother and child. The algorithm fits the user's choices against the slope of a line determined by binomial regression, in most instances assuming a Bernoulli Distribution, and logistic regression as a predictor of aesthetic interest and appeal and subsequent superior compatibility of one model or actor amongst a set of models or actors. The data is input into a binomial regression model comprising of an equation:

$$L(Y|\mu) = \prod_{i=1}^{n} (1_{y_i=1}(\mu_i) + 1_{y_i=0}(1-\mu_i)),$$

where L=likelyhood of an event occurring, Y=attraction given M or the mean of the users choices. The second half of the equation describes in more detail how this is determined through the use of multivariate regression, 1y1 representing a yes choice in a binomial system and 1y1=0 being the not set or false. In laymen's terms the likelihood of a visual match and increased interest in the advertisement is predicted by fitting the response to binomial questions (yes, no) along the slope of a line used to represent the method's confidence in a users predicted level of attraction to that of one of a set of models used for purposes of creating individualized mass marketing advertisements. This allows for an interpretation of multi-variant data along a binomial probability function. Given the limits inherent in simple linear regression as a predictive tool we utilize a logistics function to model the relationship between the probability and the explanatory variable, x (variance to mean of facial template, ordinal rank, time of choice etc) to that of y and using logistics to discriminate between the causal relationship inherent between the dependent and the independent variable. In most instances these co-efficients can be determined through existing statistical packages such as SPSS/SAS.

There is more than one test that can be used to determine the effectiveness of a coefficient in explaining the dependent variable. This includes the Wald Statistic, $$W_j = \frac{B_j^2}{SE_{B_j}^2}$$

and the Likelihood Ratio Test. The predictor function then links itself to the probability of a given outcome utilizing:

$$\text{logit}(\mathbb{E}[Y_i|X_i]) = \text{logit}(p_i) = \ln\left(\frac{p_i}{1-p_i}\right) = \beta \cdot X_i$$

The resulting match can then, be passed through secondary filters of demographic matching and personality matching or any other standardized process used in broader demographic marketing.

Once the preferred model or actor is identified their image or video will be instilled or placed into the ad by the use of "keying in" or by any other relevant process by which images of one type are inserted into the background of an existing photo's or video advertisement. In general, given the quickness, ease of detection, selection and implementation afforded by advanced facial and video technology currently on the market we expect this process to take no more than 7 seconds given a user base of 25 million potential consumers of a site or viewers of a video interface.

In another variant, the system provides a social networking website allowing the above services/products to be used in conducting searches for like minded persons seeking friendship or activity partners, events or consumer goods by presenting ads for such to similar users and utilizing information gleamed from recording their choices amongst photos of family members and friends which are found on the site. This is intended to identify and correlate the visual aesthetic of an actor or model to a users family members or friends and to those who share common respect, admiration or attraction by identifying certain facial characteristics.

The face recognition process may be a cross-platform face detection and recognition library that can be integrated into an application. The face recognition process utilizes an API (Application Programming Interface) to detect a face and facial features and to match faces. Following face detection, the process provides the coordinates of 60 plus facial feature points for further processing. For example, the facial feature points include eyes, eye corners, eyebrows, mouth corners and nose tip. The library is web-cam capable, and able to retrieve frames from compatible cameras.

The process may have the following technical specifications:

Method utilizes robust frontal face detection including the detection of multiple faces in a photo including head rotation support by −30 . . . 30 degrees of in-plane rotation and −30 . . . 30 degrees out-of-plane rotation; Determines in-plane face rotation angle; Facial Characteristic detection speed is as fast as 370 frames per second*, depending on resolution. With a realtime detection speed of 0.0027 sec (370 FPS)*and a webcam resolution of −15 . . . 15 degrees of in-plane head rotation. Giving a reliable detection of 0.7 sec with a digicam resolution of −30 . . . 30 degrees of in-plane head rotation. The returned information for each detected face is given as (x,y) coordinates of face center, face width and rotation angle; easy configuration of face detection parameters is determined by Face Matching; the matching of two faces at given FAR (False Acceptance Rate) and FRR (False Rejection Rate) with an Enrollment time of 0.117 seconds (8.5 FPS)*(at webcam resolution) a template size of 16 kb and a matching speed The system has a matching speed of 30,000 faces per second and returns basic information corresponding to a facial similarity level.

Facial Feature Detection—The image is processed to determine specific nodes of an individual's face which are then used to calculate positive correlation when matched against another facial image.

Detection of 40 facial feature points (eyes, eyebrows, mouth, nose, face contour) is indicated with a detection time of 0.59 seconds*(not including face detection stage) and an allowed head rotation of −30 . . . 30 degrees of in-plane rotation, −10 . . . 10 degrees out-of-plane rotation Method returns an information array of 40 (x,y) coordinates of each facial feature point or more for a given image.

Eye Centers Detection method is used to graph (x,y) coordinates of an individual's eye centers.

System detects eye centers only with a detection time of 0.067 seconds*(not including face detection stage)

The system returns information of two (x,y) coordinates one of the left eye center and another of the right eye center.

Library Size used in storing facial templates must meet capacity for effective implementation of the system allowing for storage of 10 MB or less although as functionality increases this figure may be revised either up or down.

The size of the redistributables does not exceed 10 MB for each platform.

match recommendation is made, after the facial templates are compared as well as the overall match score to determine aesthetic interest by the user consumer.

The system includes a personality profile feature. The personality profile is a uniquely designed test that may be based on a five dimensional personality model and may be based on 5 to 13 or more dimensions. In one example, the dimensions are extroversion/introversion, practicality, agreeableness, tough mindedness, conscientiousness, emotionality, and imaginativeness.

In another variant, a social media application is designed to integrate and maximize the interaction between social media (for example, Facebook) and the system for seeking out consumer marketing, or product matches within marketing media outside the system. The social media application may search members or non-members who have some relation or connection with the member on other social media (i.e. all users of a particular mobile social application site). In one embodiment, the application connects the database of the system and a facial recognition engine with social media profiles connected to a user. The user's choices amongst the field of provided images are categorized and recorded as to rank, time between choices, number of choices per field, time spent viewing a choice, number of subsequent choices of multiple images of one user etc. A facial recognition process is then run against each subsequent choice by the user. A predictive model is created comprising of the facial template of the user's choices which have been morphed and fit to a logistic regression model using standard facial recognition technology and a statistical package such as SPSS into a baseline attraction model for each individual user. The different choices are weighted as to the above criteria to accurately determine a model. Other factors are added such as personality compatibility and location preferences with the aggregate data being added into a binomial regression model comprising: $Y^* = X\beta + e$, to predict the likelyhood of attraction or mutual compatibility between the user and the population of human models chosen as a diverse population from which to create advertisements. Where Y=the response (confidence of attraction), X=predictive independent variables (time,face match,location), e=error rate and the B is the function feature general set to 1 if unknown.

Once the consumer's aesthetic model has been generated it is run by the marketer against a set of human models, utilizing a facial recognition process, seeking the model with the best fit to the regression curve that will indicate eye contact by the user of the method with the advertisement within a desired confidence interval.

Figure 2:
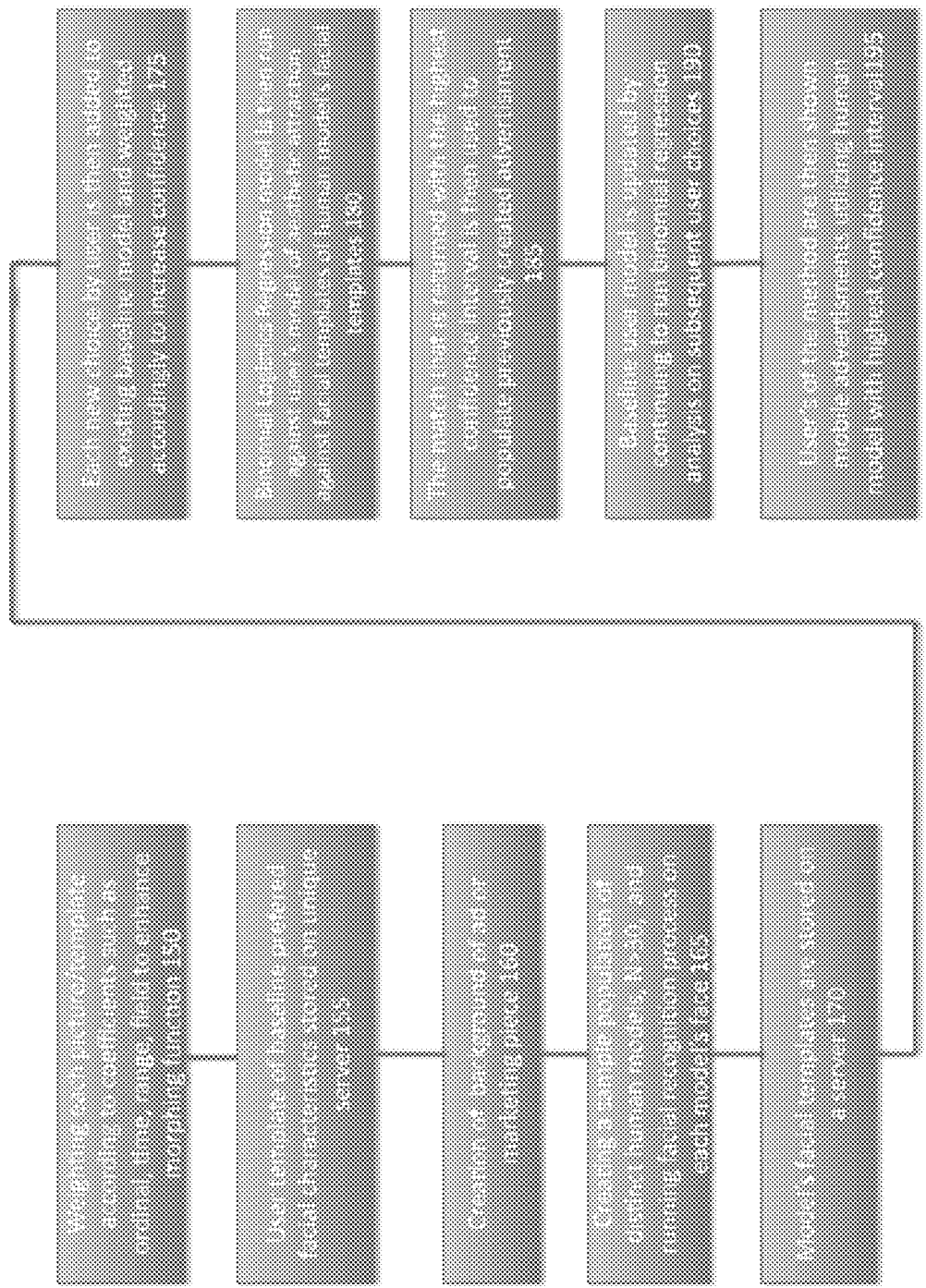
FIG. 2 is a flow chart of an example embodiment in accordance with the principles of the invention.
Figure 3:
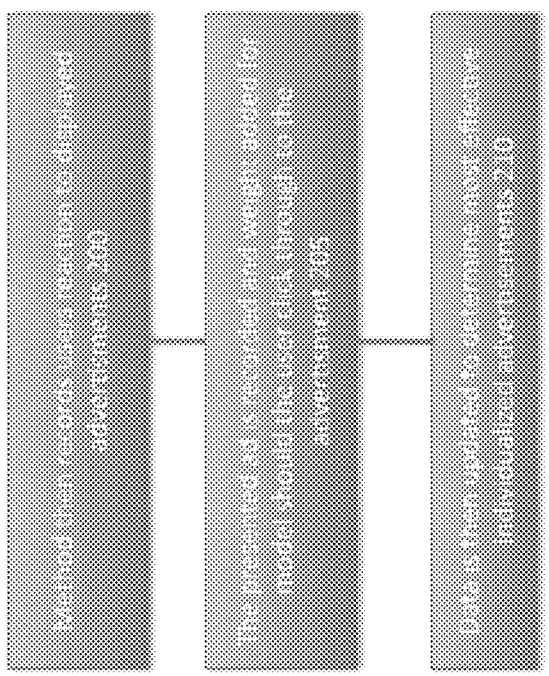
FIG. 3 is another optional variant of the invention.

In a variant, referring to FIG. 2, the method comprises: prompting users of the method to input up to three or more photographic images the user finds attractive; generating a 3-D image template based on the images using a facial recognition process; receiving images from the users in response to the prompt; storing the images in a template database; performing a morphing function using binomial regression to generate a baseline model of individual aesthetic appeal; using this to determine a human model to be placed in a pre-constructed background advertisement by keying in the model's facial photograph using photographic rendering software program Another variant uses wearable computer devices such as Google's Glass to record the focus of a user's eyes, creating a facial recognition template of human faces that the user focuses upon for specific time, factoring in variables such as indicated in paragraph 1. Creating a baseline aesthetic appeal model for the user then generating mobile advertisements using the predictor to populate ads with human models that the user will find attractive under a given confidence interval.

In still another variant, the method further comprises presenting the user with visual advertisements or cinematic programming in a public or private location, such as a sports bar. Using laser or other tracking/recognition technology to track and record viewer's eye movements or location of a viewer's eyes as to relation of images displayed on the television or movie screen, primarily in regards to facial images, determining through facial recognition who the user is focusing on and what facial features a user finds attractive.

The process subsequently creates a model of aesthetic attraction by mining this data and processing this data through our facial recognition process, ultimately generating video ads by inserting models fitting the viewer's mean aesthetic ideal using facial recognition to choose the human models/actors who will most appeal to the viewing group's sense of attraction. In the case of a group environment, statistical means will be used to determine the human model amongst the plurality of choices, with the closet fit to the aesthetic feature set determined as the group's mean of aesthetic appeal.

In yet another variant a storefront ad, marquees or billboard advertisements will be created to reflect the mean of the individual viewer's choices over a period of time. As users pass the posted advertisements, which will be expected to be on video screen or other interchangeable media, a laser or other tracking device will record users interest in or lack of interest in consistently changing advertisements, the movement of their eyes to specific models and other data such as length of visual contact with the shown image's face will be used to create aggregate profiles similar to the above variant method as well as individual profiles. Individual profiles will be created to discriminate between users, given a unique id and then that users subsequent passes and interactions with posted advertisements will be recorded and the individual's aesthetic model will be continuously enhanced by weighted criteria. All data will be stored into the server including, but not limited to, facial templates, a unique id tagged to a passers by use of facial recognition, and any categorical or quantitative data that might be pertinent in the creation and use of posted ads in a certain location.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration

What is claimed is:

1. A computer implemented predictive advertising method, for matching a user with one or more aesthetically pleasing models or actors to be inserted directly into ads directed to the individual user on mass marketing level, operable on a server comprising a processor and memory and connected to a mobile network and device, comprising:

recording a user's inputs from a field or page of multiple thumbnail or other visual images;

performing a facial recognition process on the image and storing the result of the process on the server as a template on a unique server with the intention of using the stored template as a reference in generating and optimizing a baseline template or model of the aesthetic preferences of the user;

receiving a template image comprising an image of a human face, generated from a statistical valid set of models and actors, and storing a result of the process on the server for matching and creating advertisements with users of the method;

user is expected to choose photographs of other users of the method out of field, most likely thumbnails on a mobile device for purposes of creating and further enhancing a baseline aesthetic model;

performing facial recognition processes amongst the chosen facial images and creating a template for each including additional data such as ordinal choice in field, time between screen populated and choice, time between second choice, third, number of choices per screen and number of pictures actually chosen and storing the process on the create baseline template for a user's aesthetic ideal using a facial recognition morphing function using all chosen pictures;

creating a predictor model using binomial logistic regression;

weighting each image according to above measures, ordinal, time, range, so that morphing function creates a more accurate baseline facial template;

determining goodness of fit using $R^2$;

processing each co-efficient through a statistical package to determine the Wald Statistic:

$$W_j = \frac{B_j^2}{SE_{B_j}^2}$$

or Likelihood Ratio Test;

applying the following binomial regression equation to each subsequent template to determine predictability of match:

$$L(Y|\mu) = \prod_{i=1}^{n} (1_{y_i=1}(\mu_i) + 1_{y_i=0}(1-\mu_u)),;$$

where L=likelihood of an event occurring, Y=attraction given M or the mean of the users choices. The second half of the equation describes in more detail how this is determined through the use of multivariate regression, 1y1 representing a yes choice in a binomial system and 1y1=0 being the not set or false;

user then has one template of aggregate, preferred facial characteristics that will be used to compare to the set or sets of human models and/or actor's templates previously created for use in determining an appropriate type or image to be used in an individualized mass advertisement campaign;

alternatively a template is created by determining mode of choices and morphing baseline template from all applicable images;

determining mode and mean of choices and running standard deviation of each with which to create sample population for user which is then applied and updated to subsequent image fields;

recording future choices and repeating the process to fine tune baseline facial template;

processing database of users and returning field of images to querant within one degree of standard deviation from mean or mode;

processing each image using threshold and predictability of matching variables at certain confidence intervals utilizing; $Y^* = X\beta + e$ Where Y=the response (confidence of attraction), X=predictive variable (time, face match, location), e=error rate and the B is the function feature general set to 1 if unknown;

recording choices of user and repopulating field of images with tightening degree of accuracy based on process in claim one;

assigning chosen each image a z score;

determining most accurate method of matching by comparing subsequent choices using either binomial or latent regression models template match's mean, mode or other factors and assessing method best suited to predict user compatibility by then creating binomial distribution table to determine potential for mutual compatibility;

aggregate outlying data to determine if there is any secondary or tertiary facial type's user would be attracted to and applying claim one to these to determine if there is any alternate template possible to that of the baseline.

2. The method of claim 1 further comprising a computer and video projection device method by which organized groups of users, such as at a sports-bar, are identified by a facial recognition method, having a model of the users face created by laser or other recording/tracking technology and the user's eye contact amongst a plurality of choices shown to the user of visual advertisements or commercials are detected, recorded and the object of interest used to create a baseline aesthetic model for the user;

these choices are stored on a server;

data is labeled using facial recognition an anonymous id tag;

users recorded choices are put into a latent variable binomial logistic regression model similar to the algorithm:

$$Y_I^{0*} = \beta_0 - X_f + \epsilon_0$$

$$Y_I^{1*} = \oplus_1 - X_f + \epsilon_1$$

where $$\epsilon_0 \sim EV_1(0,1)$$

$$\epsilon_1 \sim EV_1(0,1)$$

$EV_1(0,1)$ is a standard type-1 extreme value distribution: i.e. then $$Pr(\epsilon_0 = \chi) = Pr(\epsilon_1 = \chi) = e^{-\chi} e^{-e^{-\chi}}$$

which is then used to generate each member of the groups individual model of aesthetic appeal extending the logistics regression model into a multi-outcome model similar to the multinomial logit model;

the individual models are then input into another binomial regression algorithm or similar mathematical predictor to determine the mean average of the multiple users aesthetic appeal;

after a statistically significant set of facial template models are created for the group; future advertisements are then generated, by use of keying in or using previously created ads, featuring versatile model or actor choices that would be the best fit to the mean of the average of the viewing groups aesthetic appeal;

video commercials are then created and played directly to the mean of the consumers of a specific location, and the use and insertion of the specific actors is determined by statistical inference of group preference and overall group appeal.

3. The method of claim 1 further comprising a stationary computerized or video screen advertisement connected to a computer server and using facial recognition to record and generate more appealing advertisements to the broader audience of the locale using statistical regression and ad generation software to create more relevant advertisements to the group as a whole;

each passing individual's facial characteristics are recorded and stored as a template on a server;

a unique user id is assigned to that template;

the use of a laser or other tracking device to determine contact of a user's eyes with that of an image on an advertisement;

the method of claim 1 where the user's choices of interest, in this case determined initially by eye contact, with facial images on a stationary advertisement are recorded and stored on the server;

the additional recording of other pertinent data such as length of contact, repeat contact and similarity of contact with other visual models in nearby advertising;

collected data and information is input into a predictive model using binomial logistic regression such as $Y^* = X\beta + e$;

the Predictive model can also be geared towards multivariate data in which case a Probits model would be a more likely predictor;

daily aggregate data on all passerby's and their aesthetic preference templates are then compiled to create a mean of the local or advertising spots potential users is then used to generate fluid advertising;

creating a multinomial logistic regression predictor model and determining aggregate co-efficientes to predict the highest likelihood/positive outcome overall aesthetic attraction model;

inserting the most appealing model or actor, $Y=1$, from amongst a plurality of potential models or actors into the new ads being shown on the screen or device used to present the advertisement;

facial recognition is then used to mine and integrate additional data by linking generated profiles to other profiles of the same user across separate servers and created on other devices; with additional demographic data attached used to further define the most advantageous model and advertisement to be displayed in a specific location.

* * * * *